United States Patent [19]

Atkey

[11] 4,399,685

[45] Aug. 23, 1983

[54] FORCE AND KINETIC ENERGY MEASURING DEVICE

[75] Inventor: Richard E. Atkey, Memphis, Tenn.

[73] Assignee: Dover Corporation, Memphis, Tenn.

[21] Appl. No.: 232,569

[22] Filed: Feb. 9, 1981

[51] Int. Cl.³ ............................................. G01L 1/04
[52] U.S. Cl. .................................... 73/11; 73/862.62
[58] Field of Search ............... 73/11, 12, 862.62, 709, 73/432 R, 432 A, 380

[56] References Cited

U.S. PATENT DOCUMENTS

| | | |
|---|---|---|
| 280,491 | 7/1883 | MacKay et al. |
| 468,154 | 2/1892 | McClure |
| 1,392,587 | 10/1921 | Low ........................................ 73/709 |
| 1,637,421 | 8/1927 | Lipschutz |
| 1,825,491 | 9/1931 | Walters |
| 1,836,601 | 12/1931 | Key ........................................ 73/709 |
| 1,961,368 | 6/1934 | Larson ................................... 265/18 |
| 2,163,847 | 6/1939 | Perrey ..................................... 73/12 |
| 2,450,188 | 9/1948 | Graaf .................................... 73/141 |
| 2,491,508 | 12/1949 | Mann .................................... 265/63 |
| 2,612,042 | 9/1952 | Clarke ................................... 73/141 |
| 2,673,464 | 3/1954 | Züblin ................................... 73/141 |
| 2,816,439 | 12/1957 | Hayes ..................................... 73/81 |
| 2,850,878 | 9/1958 | Sampietro et al. ..................... 60/97 |
| 2,986,937 | 6/1961 | Chapman .............................. 73/379 |

Primary Examiner—Anthony V. Ciarlante
Assistant Examiner—Denis E. Corr
Attorney, Agent, or Firm—Brumbaugh, Graves, Donohue & Raymond

[57] ABSTRACT

A device for measuring both force and kinetic energy includes a first cylindrical tube with one end closed, which tube is positioned over a calibrated spring that has one of its ends adjacent the closed end of the first tube. The other end of the spring extends beyond the open end of the first tube and is received within a second cylindrical tube mounted to slide over the first tube and having one closed end adjacent the other end of the spring. For measuring kinetic energy an indicator member is positioned about the first tube in such a manner that it is displaceable by contact with the open end of the second tube during compression of the spring and remains on the first tube at the point of maximum displacement when the compression of the spring is relieved. The position of the indicator with respect to the first tube is a measure of the kinetic energy that compressed the spring and the position of the second tube with respect to the first tube is a measure of that static compression force on the spring.

6 Claims, 4 Drawing Figures

FORCE AND KINETIC ENERGY MEASURING DEVICE

BACKGROUND OF THE INVENTION

The present invention relates to a combined force and kinetic energy measuring device and, more particularly, to a device for measuring elevator door-closing force and kinetic energy.

The American National Standard Safety Code ANSI A17.1-1978 for Elevators, Dumbwaiters, Escalators and Moving Walks, requires that powered horizontal sliding elevator doors be restricted in their motion by two rules. The first rule, number 112.4a, limits the total kinetic energy in the door system to seven (7) foot-pounds where a reopening device is used and two and one-half (2½) foot-pounds where such a door reopening device is not used. The second rule, number 112.4b, limits the force necessary to prevent the closing of the door system to thirty (30) pounds measured at the leading edge of the door in the middle one-third of travel. The measuring of the force limitation is accomplished easily by a simple compression spring gauge. The measurement of the total kinetic energy of the door system has, however, been more difficult. The present prescribed method of determining the kinetic energy of the door involves measuring its average closing speed as described in rule 112.4a-1 and 2 and combining this with the mass of the door system in the formula:

$$KE = \tfrac{1}{2}MV^2$$

where
KE = kinetic energy
M = mass
V = velocity

The problem is that the masses of the system are difficult to establish, since some are rotational and some linear, and they vary from elevator to elevator depending on the configuration and material used in the door system. It has historically been a problem to establish the mass of a specific system and therefore difficult for safety enforcement authorities to confidently confirm compliance with the rules.

In U.S. Pat. No. 2,163,847 of Perrey, a device for measuring the impact of an article of known mass is described. The device, which has a small inertial member also of known mass, is attached directly to the article whose impact is to be measured. The inertial member is attached to a precision calibrated spring and carries an indicator. When the article impact occurs, the inertial member's deflection is controlled by the spring and the size of the deflection is recorded by the indicator. The deflection is an indication of the kinetic energy of the inertial member and it is related to the kinetic energy of the article by the ratio of their masses. If this device were used to measure the kinetic energy of an elevator door, there would still remain the problem of calculating the mass of the door system.

SUMMARY OF THE INVENTION

The present invention relates to a device which will easily and accurately measure both the closing force and kinetic energy of a power-operated door system without determining the mass of the door system. This object is achieved by having the door system act as a mass directly in conjunction with a calibrated spring and by measuring the maximum deflection and final deflection of the spring.

In an illustrative embodiment of the invention the device comprises a spring over which a first tube having one end closed is slidably arranged so that part of the spring extends beyond the open end of the tube. A second larger tube, also with one end plugged, is arranged so it not only contains the part of the spring extending beyond the first tube, but also slides over the first tube. A third tube having both ends open and a circular flange at one end, is slidably arranged between the outside of the first tube and the inside of the second tube.

In operation the device is held horizontally and allowed to interrupt the closing of a powered door system. In the middle ⅓ of the door travel, the spring is compressed until the total energy of the door system is absorbed and then it springs back until only the closing force is resisted. The first tube is so marked and the spring is so calibrated that its relation to the second tube will be a direct reading of the closing force and a measure of the door system's compliance with rule 112.4b. The third tube is so arranged between the first and the second tubes that it slides out upon the impact of the doors and comes to rest at the maximum deflection of the spring. The distance between the maximum deflection and the final resting place of the spring is, therefore, a measure of the kinetic energy of the system and the proper marking of this third tube permits kinetic energy to be read directly.

BRIEF DESCRIPTION OF THE DRAWINGS

The foregoing and other features of the present invention will be more readily apparent from the following detailed description of illustrative embodiments and drawings of the invention in which.

DESCRIPTION OF ILLUSTRATIVE EMBODIMENTS

Figure 1:
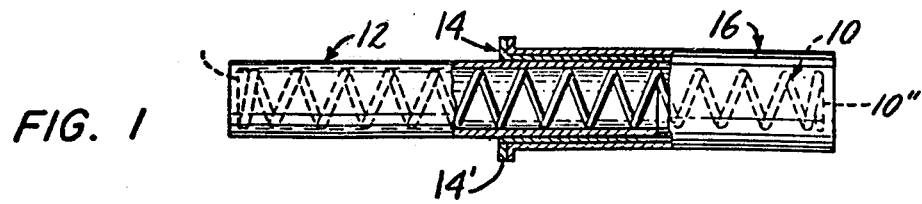
FIG. 1 is a side sectional view of a device according to the present invention.
Figure 2:
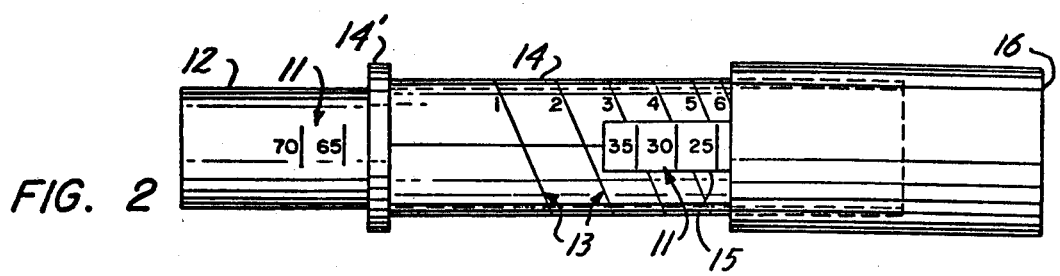
FIG. 2 is an enlarged side view of the device of FIG. 1 showing the kinetic energy and force scales.

In FIG. 1 there is shown a precision calibrated spring 10, that has one end 10' retained against the closed end of a hollow tube 12 such that the other end 10" of the spring extends beyond an open end of the tube 12. Mounted on tube 12 in slidable fashion is a tube 14 with a flange 14' at one end. The tube 14 is made shorter in length than the tube 12. Slidably mounted over tube 14 is a tube 16 which has a closed end adjacent the end 10" of the spring. On the exterior surface of tube 12 there are markings 11 (FIG. 2) related to the amount of compression of spring 10, i.e. the distance which tube 12 has moved into tube 16. These distance markings can be set off in units representing the equivalent force necessary to compress the spring that distance. In addition the outer surface of tube 14 is marked off with indicator lines 13, as also shown in FIG. 2, to represent the amount of kinetic energy imparted to the device in a manner to be described.

When the device is held in the path of an article whose kinetic energy and force are to be measured, e.g. a horizontal powered elevator door, the initial impact causes the tube 12 to move within both tubes 14 and 16 which are held together by flange 14'. This motion causes compression of spring 10 until the kinetic energy of the door is converted into potential energy stored in the spring. Once the motion of the door has stopped, the spring begins to recoil. The spring will expand until its force just balances the closing force of the door and a static or stalled position is reached. The expansion of the spring causes tubes 12, 16 to separate from each other because the ends of the spring press against these tubes. However, tube 14 is so mounted on tube 12 that it will travel with tube 12 during the recoil. Because of this the position of tube 14 on tube 12 after the recoil is an indication of the maximum compression of the spring that was experienced. As will be shown, this is a direct indication of the amount of kinetic energy that caused the compression, and this distance can be calibrated to be an indication of the kinetic energy of the elevator door, even if the mass of the door is unknown.

Further, when the door is held in a static or stalled position by the device, the compression of the spring at that time is a direct indication of the closing force of the door. Thus the relative position of tube 12 with respect to tube 14 and tube 16 gives the door closing kinetic energy and the door closing force, respectively. In order to read the door closing force, it may be necessary to create a slot 15 in tube 14 through which markings on tube 12 can be read with respect to the end of tube 16, or alternatively, the tube 14 can be made of a transparent material.

Figure 3:
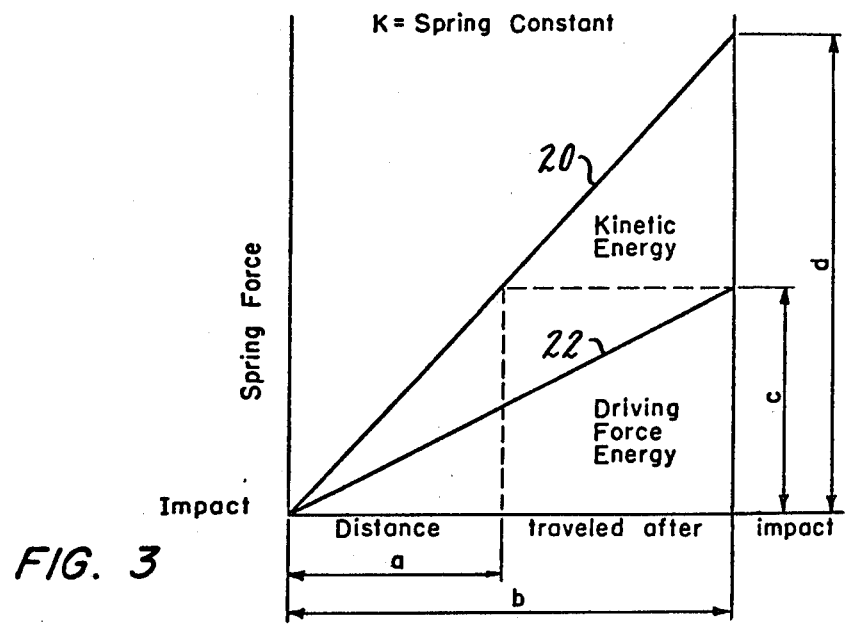
FIG. 3 is a graph of the relationship between the spring force and spring deflection.

In examining the mathematics involved, FIG. 3 should be referred to. The graph shows that the total potential energy stored in the spring, i.e. the area under curve 20 represents both the kinetic energy of the door system and the driving force of the motor which is trying to close the door. Since $a$ represents the stalled position of tube 12 with respect to tube 16, the intersection of this value with curve 20 represents the driving force c. Thus the area under curve 22 is the driving force energy. The distance b represents the maximum displacement, i.e. the distance between tube 14 and tube 16 and its intersection of the curve 20 gives the total force d. To arrive at the kinetic energy of the door system the driving force energy must be subtracted from the total energy, i.e.:

$$KE = \tfrac{1}{2}bd - \tfrac{1}{2}bc$$

However, since $c=aK$ and $d=bK$, where K is the spring constant $$KE = \tfrac{1}{2}Kb(b-a)$$

Since the position of the tube 14 with respect to tube 16 is a direct measure of (b−a), tube 14 can be marked so that kinetic energy may be read directly.

Figure 4:
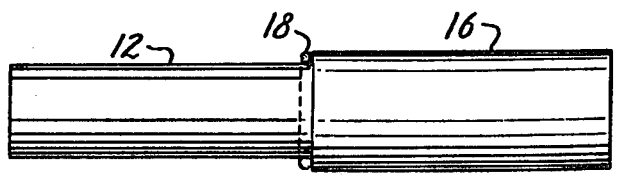
FIG. 4 is a side view partly in section of an alternative embodiment of the invention.

In FIG. 4 the tube 14 has been replaced by an elastic band or "O" ring 18. During impact this band is pushed along tube 12 to the maximum displacement point and remains there. With such an arrangement both force and kinetic energy scales are marked on tube 12. Since the band is of only a small thickness, there is no need for it to be transparent or to have a slot so that the markings on tube 12 can be read. Also, the band 18 is cheaper and easier to manufacture than the tube 14.

While the invention has been particularly shown and described with reference to exemplary embodiments thereof, it will be understood by those skilled in the art that various changes in form and details may be made therein without departing from the spirit and scope of the invention. In particular, this device for measuring a combination of kinetic energy and driving force is not restricted to elevator doors or the elevator industry.

I claim:

1. A device for measuring both force and kinetic energy comprising:
   a first cylindrical tube having one end closed and the other end open;
   a calibrated spring positioned within the first tube and having one end adjacent the closed end of the tube, the other end of the spring extending beyond the open end of the first tube;
   a second cylindrical tube having one end closed, an open end of the second tube sliding over the first tube and the other end of the spring being received within said second tube and positioned adjacent its closed end; and
   an indicator means positioned about said first cylindrical tube in such a manner that it is displaceable by contact with the open end of the second tube during compression of the spring by movement of the first tube within the second during the initiation of an impact of a particular mass with the device under the influence of a particular force, and remains on the first tube at the point of maximum displacement when the compression of the spring is at least somewhat relieved as it assumes a static position under the influence of the force.

2. A device as claimed in claim 1, wherein the first tube is marked with force indications that are read with respect to the static position of the open end of the second tube.

3. A device as claimed in claims 1 or 2, wherein the indicator member is a third tube slidably positioned between said first and second tubes and having a flange at one end which contacts the open end of the second tube, said third tube being marked with kinetic energy indications that are read with respect to the static position of the open end of the second tube.

4. A device as claimed in claim 3, wherein the third tube is transparent so that force markings on the first tube can be read through it.

5. A device as claimed in claim 3, wherein the third tube has a slot in its longitudinal direction so that force markings on the first tube can be read through it.

6. A device as claimed in claim 1 or 2, wherein the indicator member is an elastic band mounted on said first tube and said first tube is additionally marked with kinetic energy indications that are read with respect to the position of said elastic band.

* * * * *